US009147167B2

(12) United States Patent
Urmanov et al.

(10) Patent No.: US 9,147,167 B2
(45) Date of Patent: Sep. 29, 2015

(54) SIMILARITY ANALYSIS WITH TRI-POINT DATA ARBITRATION

(71) Applicant: ORACLE INTERNATIONAL CORPORATION, Redwood Shores, CA (US)

(72) Inventors: Aleksey M. Urmanov, San Diego, CA (US); Anton A. Bougaev, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 116 days.

(21) Appl. No.: 13/680,417

(22) Filed: Nov. 19, 2012

(65) Prior Publication Data
US 2014/0143182 A1 May 22, 2014

(51) Int. Cl.
G06N 99/00 (2010.01)
(52) U.S. Cl.
CPC .................................. G06N 99/005 (2013.01)
(58) Field of Classification Search
None
See application file for complete search history.

(56) References Cited

U.S. PATENT DOCUMENTS

| 6,591,411 B2 * | 7/2003 | Alpert et al. ................... 716/129 |
| 2012/0054184 A1 | 3/2012 | Masud et al. |

OTHER PUBLICATIONS

Hale Erten, Alper Ungor, "Triangulations with Locallly Optimal Steiner Points", Eurographics Symposium on Geometry Processing, 2007, pp. 1-10.*

Yang Zhou, Hong Cheng and Jeffrey Xu Yu, "Graph Clustering Based on Structural/Attribute Similarities", Proceedings of the 35th International Conference on Very Large Data Bases (VLDB'09)/PVLDB Journal, 2009, pp. 718-729.*

Peng et al.; Interval Data Clustering with Applications; Proceedings of the 18th IEEE International Conference on Tools with Artificial Intelligence (ICTAI'06); pp. 1-8.

Sung-Hyuk Cha; Comprehensive Survey on Distance/Similarity Measures between Probability Density Functions; International Journal of Mathematical Models and Methods in Applied Sciences; Issue 4, vol. 1, 2007; pp. 300-307.

Choi, et al.; A Survey of Binary Similarity and Distance Measures; Department of Computer Science, Pace University; New York, US; pp. 1-6, Journal of Systematics, Cybernetics, and ± A Formatics 2010.

Huttenlocher, et al.; Comparing Images Using the Hausdorff Distance; IEEE Transactions on Pattern Analysis and Machine Intelligence; vol. 15; No. 9, Sep. 1993; pp. 850-863.

Ellis et al.; Measuring the Degree of Similarity Between Objects in Text Retrieval Systems; Department of Information Studies, University of Sheffield; Perspectives in Information Management, vol. 3, No. 2, pp. 128-149, Jan. 1993.

* cited by examiner

*Primary Examiner* — Kakali Chaki
*Assistant Examiner* — Walter Hanchak
(74) *Attorney, Agent, or Firm* — Kraguljac Law Group, LLC

(57) ABSTRACT

Systems, methods, and other embodiments associated with similarity analysis using tri-point arbitration are described. In one embodiment, a method includes selecting a data point pair and an arbiter point from a data set. A tri-point arbitration coefficient (ρTAC) is calculated for data point pairs based, at least in part, on a distance between the first and second data points and the arbiter point. A similarity metric is determined for the data set based, at least in part, on an aggregation of tri-point arbitration coefficients for data point pairs in the set of data points using the selected arbiter point.

21 Claims, 6 Drawing Sheets

$$\rho TAC(x_1, x_2 | a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}}$$

210

SIMILARITY ANALYSIS WITH TRI-POINT DATA ARBITRATION

BACKGROUND

Data mining and decision support technologies use machine learning to identify patterns in data sets. Machine learning techniques include data classification, data clustering, pattern recognition, and information retrieval. Technology areas that utilize machine learning include merchandise mark-down services in retail applications, clinician diagnosis and treatment plan assistance based on similar patients' characteristics, and general purpose data mining. The various machine learning techniques rely, at their most basic level, on a distance between pairs of data points in a set of data as a measure of similarity or dissimilarity. Machine learning has become one of the most popular data analysis and decision making support tool in recent years. A wide variety of data analysis software packages incorporate machine learning to discover patterns in large quantities of data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
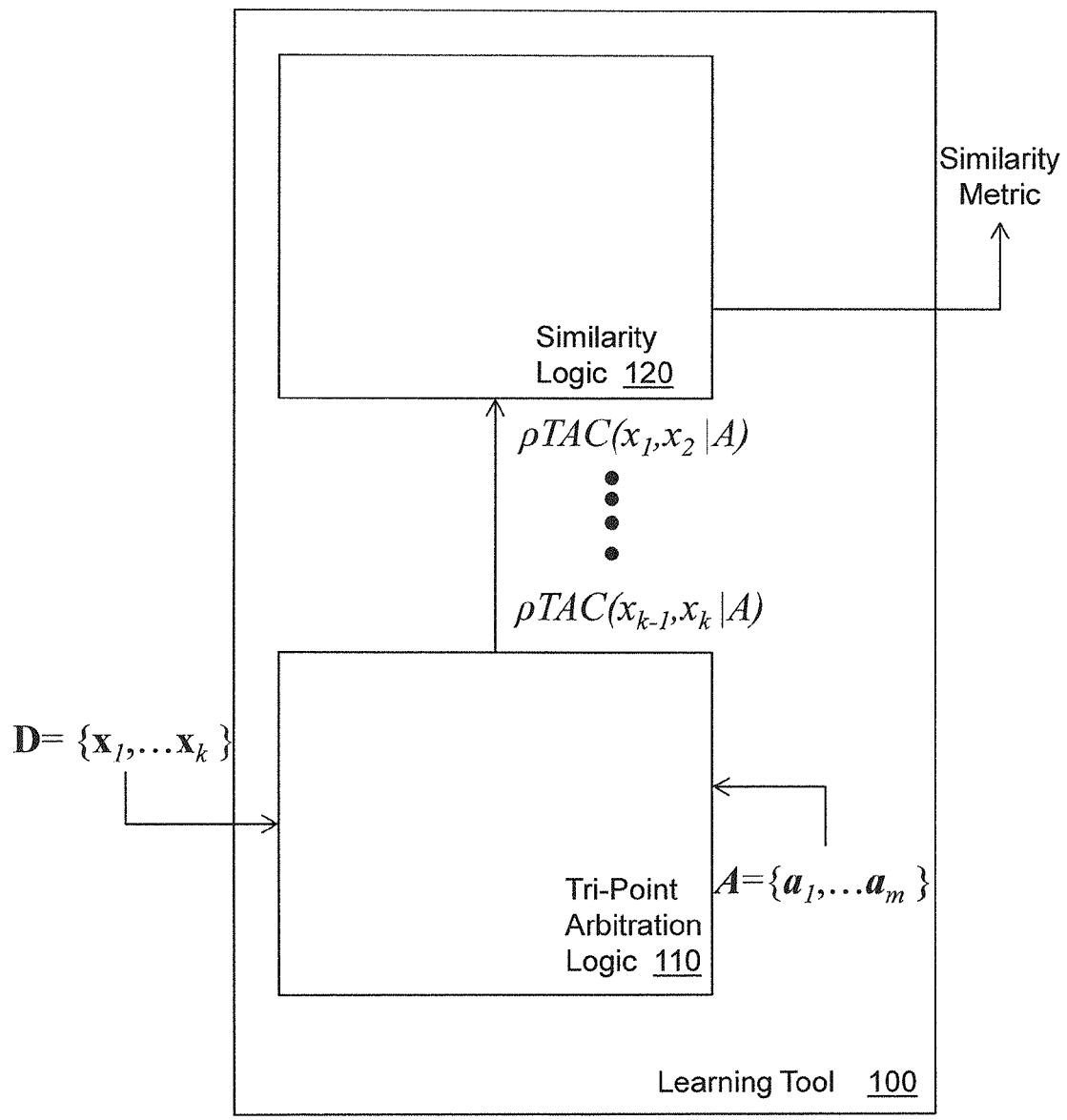
FIG. 1 illustrates an embodiment of a system associated with similarity analysis with tri-point data arbitration.

The basic building block of traditional similarity analysis in machine learning and data mining is categorizing data and their attributes into known and well-defined domains and identifying appropriate relations for handling the data and their attributes. For example, similarity analysis includes specifying equivalence, similarity, partial order relations, and so on. In trivial cases when all attributes are numeric and represented by real numbers, comparing data point attributes is done by using the standard less-than, less-than-or-equal, more-than, and more-than-or-equal relations, and comparing points by computing distances (e.g., Euclidean) between the two points. In this case, the distance between two data points serves as the measure of similarity between the data points. If the distance is small, the points are deemed similar. If the distance is large, the points are deemed dissimilar.

A matrix of pair-wise distances between all data points in a data set is a standard similarity metric that is input to a variety of data mining and machine learning tools for clustering, classification, pattern recognition, and information retrieval. Euclidean distance is one possible distance between data points for use in the pair-wise matrix. A variety of other distance-based measures may be used depending on the specific domain of the data set. However, the distance based measures used in traditional machine learning are understandably all based on two data points.

One of the deficiencies of the traditional two data point distance approach to similarity analysis is the subjectivity that is introduced into the analysis by an outside analyst. An outside analyst determines the threshold on distances that indicate similarity. This leads to non-unique outcomes which depend on the analyst's subjectivity in threshold selection.

Traditionally, a determination as to what constitutes "similarity" between data points in a data set is made by an analyst outside the data set. For example, a doctor searching for patients in a data set having "similar" age to a given patient specifies an age range in her query that, in her opinion, will retrieve patients with a similar age. However, the age range that actually represents "similar" ages depends upon the data set itself. If the data set contains patients that are all very similar in age to the given patient, the query may be over-selective, returning too many patients to effectively analyze. If the data set contains patients that have ages that have a wide variety of ages, the query may be under-selective, missing the most similar patients in the data set.

Another deficiency in the tradition two point distance approach to similarity analysis is the conceptual difficulty of combining attributes of different types into an overall similarity of objects. The patient age example refers to a data point with a single, numerical, attribute. Most machine learning is performed on data points that have hundreds of attributes, with possibly non-numerical values. Note that the analyst will introduce their own bias in each dimension, possibly missing data points that are actually similar to a target data point. Some pairs of points may be close in distance for a subset of attributes of one type and far apart in distance for another subset of attribute types. Thus, the analyst may miss data points that are similar to the target data point for reasons that are as yet unappreciated by the analyst. Proper selection of the similarity metric is fundamental to the performance of clustering, classification and pattern recognition methods used to make inferences about a data set.

Systems and methods are described herein that provide similarity analysis with tri-point arbitration. Rather than determining similarity by an external analyst, tri-point arbitration determiners similarity with an internal arbiter that is representative of the data set itself. Thus, rather than expressing similarity based on distances between two points and forcing the analyst to determine a range of distances that is similar, the systems and methods herein use three points to determine similarity, thereby replacing the external analyst with an internal arbiter point that represents the data set, i.e., introducing an internal analyst into similarity determination.

Tri-point arbitration is realized through the introduction of an arbiter data point into the process of evaluation of two or more data points for processing attributes and attribute combinations allowing for inference about possible relationships between the data points. The term "data point" is used in the most generic sense and can represent points in a multidimensional metric space, images, sound and video streams, free texts, genome sequences, collections of structured or unstructured data of various types. The disclosed tri-point arbitration techniques uncover the intrinsic structure in a group of data points, facilitating inferences about the interrelationships among data points in a given data set or population. The disclosed tri-point arbitration techniques have extensive application in the fields of data mining, machine learning, and related fields that in the past have relied on two point distance based similarity metrics.

With reference to FIG. 1, one embodiment of a learning tool 100 that performs similarity analysis using tri-point arbitration is illustrated. The learning tool 100 inputs a data set D of data points $\{x_1, \ldots, x_k\}$ and calculates a similarity metric using tri-point arbitration. The learning tool 100 includes a tri-point arbitration logic 110 and a similarity logic 120. The tri-point arbitration logic 110 selects a data point pair $(x_1, x_2)$ from the data set. The tri-point arbitration logic 110 also selects an arbiter point $(a_1)$ from a set of arbiter points, A, that is representative of the data set. Various examples of sets of arbiter points will be described in more detail below.

The tri-point arbitration logic 110 calculates a tri-point arbitration coefficient for the data point pair based, at least in part, on a distance between the first and second data points and the selected arbiter point $a_1$. The tri-point arbitration logic 110 calculates additional respective tri-point arbitration coefficients for the data point pair $(x_1, x_2)$ based on respective arbiter points $(a_2-a_m)$. The tri-point arbitration coefficients for the data pair are combined in a selected manner to create an aggregate tri-point arbitration coefficient for the data pair. The aggregate tri-point arbitration coefficient for the data point pair, denoted $\rho TAC(x_1, x_2|A)$, is provided to the similarity logic 120. The tri-point arbitration logic 110 computes aggregate tri-point arbitration coefficients for the other data point pairs in the data set and also provides those tri-point arbitration coefficients to the similarity logic 120.

Figure 2:
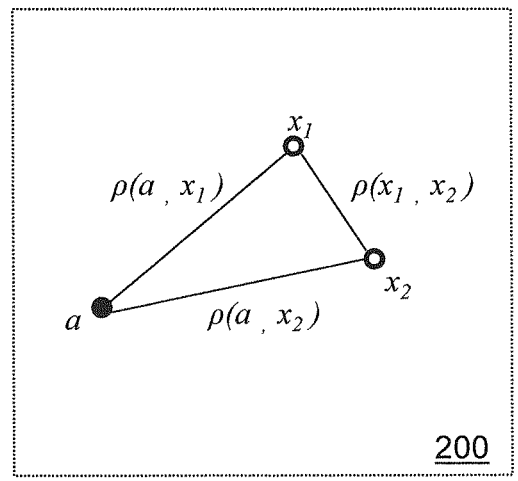
FIG. 2 illustrates an embodiment of a method associated with similarity analysis with tri-point data arbitration.
Figure 2:

FIG. 2 illustrates one embodiment of a tri-point arbitration technique that may be used by the tri-point arbitration logic 110 to compute the tri-point arbitration coefficient. A plot 200 illustrates a spatial relationship between the data points in the data point pair $(x_1, x_2)$ and an arbiter point a. Recall that the data points and arbiter point will typically have many more dimensions than the two shown in the simple example plot 200. The data points and arbiter points may be points or sets in multi-dimensional metric spaces, time series, or other collections of temporal nature, free text descriptions, and various transformations of these. A tri-point arbitration coefficient for data points $(x_1, x_2)$ with respect to arbiter point a is calculated as shown in 210, where $\rho$ designates a two-point distance determined according to any appropriate technique:

$$\rho TAC(x_1, x_2 | a) = \frac{\min\{\rho(x_1, a), \rho(x_2, a)\} - \rho(x_1, x_2)}{\max\{\rho(x_1, x_2), \min\{\rho(x_2, a), \rho(x_2, a)\}\}}$$

Thus, the tri-point arbitration technique illustrated in FIG. 2 calculates the tri-point arbitration coefficient based on a first distance between the first and second data points, a second distance between the arbiter point and the first data point, and a third distance between the arbiter point and the second data point.

Values for the tri-point arbitration coefficient for a single arbiter point, $\rho TAC(x_1, x_2|a)$, range from $-1$ to 1. In terms of similarities, $\rho TAC(x_1, x)|a)>0$ when both distances from the arbiter to either data point are greater than the distance between the data points. In this situation, the data points are closer to each other than to the arbiter. Thus a positive tri-point arbitration coefficient indicates similarity, and the magnitude of the positive coefficient indicates a level of similarity.

$\rho TAC(x_1, x_2|a)=+1$ indicates a highest level of similarity, where the two data points are coincident with one another.

In terms of dissimilarity, $\rho TAC(x_1, x_2|a)<0$ results when the distance between the arbiter and one of the data points is less than the distance between the data points. In this situation, the arbiter is closer to one of the data points than the data points are to each other. Thus a negative tri-point arbitration coefficient indicates dissimilarity, and the magnitude of the negative coefficient indicates a level of dissimilarity. $\rho TAC(x_1, x_2|a)=-1$ indicates a complete dissimilarity between the data points, when the arbiter coincides with one of the data points.

A tri-point arbitration coefficient equal to zero results when the arbiter and data points are equidistant from one another. Thus $\rho TAC(x_1, x_2|a)=0$ designates complete indifference with respect to the arbiter point, meaning that the arbiter point cannot determine whether the points in the data point pair are similar or dissimilar.

Returning to FIG. 1, the similarity logic 120 determines a similarity metric for the data set based, at least in part, on the aggregate tri-point arbitration coefficients for the data point pairs. In one embodiment, the similarity metric is a pair-wise matrix, $M_{TAC}$, of tri-point arbitration coefficients using the empirical formulation:

$$M_{TAC} = \begin{matrix} \rho ETAC(x_1, x_1 | D) & \ldots & \rho ETAC(x_1, x_2 | D) \\ \rho ETAC(x_2, x_1 | D) & \ldots & \rho ETAC(x_2, x_k | D) \\ \ldots & & \\ \rho ETAC(x_k, x_1 | D) & \ldots & \rho ETAC(x_k, x_k | D) \end{matrix}$$

The illustrated pair-wise $M_{TAC}$ matrix arranges the aggregate tri-point arbitration coefficient for the data points in rows and columns where rows have a common first data point and columns have a common second data point. When searching for data points that are similar to a target data point within the data set, either the row or column for the target data point will contain tri-point arbitration coefficients for the other data points with respect to the target data point. High positive coefficients in either the target data point's row or column may be identified to determine the most similar data points to the target data point. Further, the pair-wise $M_{TAC}$ matrix can be used for any number of learning applications, including clustering and classification based on the traditional matrix of pair-wise distances. The matrix may also be used as the proxy for similarity/dissimilarity of the pairs.

As already discussed above, the arbitration point(s) represent the data set rather than an external analyst. There are several ways in which a set of arbitration points may be selected that represents the data set. The set of arbitration points A may represent the data set based on a empirical observation of the data set. For example, the set of arbitration points may include all points in the data set. The set of arbitration points may include selected data points that are weighted when combined to reflect a contribution of the data point to the overall data set. The aggregate tri-point arbitration coefficient calculated based on a set of arbitration points that are an empirical representation of the data set (denoted $\rho ETAC(x_1, x_2|A)$ may be calculated as follows:

$$\rho ETAC(x_1, x_2 | A) = \frac{1}{m} \sum_{i=1}^{m} \rho TAC(x_1, x_2 | a_i)$$

Variations of aggregation of arbitration points including various weighting schemes may be used. Other examples of aggregation may include majority/minority voting, computing median, and so on.

For a known or estimated probability distribution of data points in the data set, the set of arbitration points corresponds to the probability distribution, f(a). The aggregate tri-point arbitration coefficient calculated based on the probability distribution (denoted ρPTAC) may be calculated as follows:

$$\rho PTAC(x_1, x_2 \mid f(a)) = \int_{lo}^{hi} \rho TAC(x_1, x_2 \mid a) f(a) da$$

As an illustration, the ρPTAC for a uniformly distribution of data points in intervals computed analytically in closed form are given by the following equations assuming the Euclidean distance.

For $a_1 < x_1 - (x_2 - x_1) < x_1 < x_2 < x_2 + (x_2 - x_1) < a_2$, the ρPTAC is given by:

$$\rho PTAC(x_1, x_2 \mid f(a)) =$$
$$\frac{x_1 - (x_2 - x_1) - a_1}{a_2 - a_1} + \frac{x_2 - x_1}{a_2 - a_1}(\log(x_2 - x_1) - \log(x_1 - a_1)) +$$
$$\frac{5}{8}\frac{x_2 - x_1}{a_2 - a_1} - \frac{3}{2}\frac{x_2 - x_1}{a_2 - a_1} + \frac{5}{8}\frac{x_2 - x_1}{a_2 - a_1} - \frac{3}{2}\frac{x_2 - x_1}{a_2 - a_1} +$$
$$\frac{a_2 - (x_2 + (x_2 - x_1))}{a_2 - a_1} - \frac{x_2 - x_1}{a_2 - a_1}(\log(a_2 - x_2) - \log(x_2 - x_1))$$

For $x_1 - (x_2 - x_1) < a_1$ and $x_2 + (x_2 - x_1) < a_2$, the ρPTAC is:

$$\rho TAC(x_1, x_2 \mid f(a)) =$$
$$\frac{(x_1 - a_1)^2}{2(x_2 - x_1)(a_2 - a_1)} + \frac{x_2 - x_1}{8(a_2 - a_1)} - \frac{x_1 + (x_2 - x_1)/2 - a_1}{a_2 - a_1} + \frac{5}{8}\frac{x_2 - x_1}{a_2 - a_1} -$$
$$\frac{3}{2}\frac{x_2 - x_1}{a_2 - a_1} + \frac{a_2 - (x_2 + (x_2 - x_1))}{a_2 - a_1} - \frac{x_2 - x_1}{a_2 - a_1}(\log(a_2 - x_2) - \log(x_2 - x_1))$$

And for $x_1 - (x_2 - x_1) > a_1$ and $x_2 + (x_2 - x_1) > a_2$, the PTAC is:

$$\rho TAC(x_1, x_2 \mid f(a)) =$$
$$\frac{x_1 - (x_2 - x_1) - a_1}{a_2 - a_1} + \frac{x_2 - x_1}{a_2 - a_1}(\log(x_2 - x_1) - \log(x_1 - a_1)) + \frac{5}{8}\frac{x_2 - x_1}{a_2 - a_1} -$$
$$\frac{3}{2}\frac{x_2 - x_1}{a_2 - a_1} + \frac{x_2 - x_1}{8(a_2 - a_1)} + \frac{(a_2 - x_2)^2}{2(x_2 - x_1)(a_2 - a_1)} - \frac{a_2 - (x_2 - (x_2 - x_1)/2)}{a_2 - a_1}$$

Thus, the tri-point arbitration coefficient can be calculated using an empirical observation of the data point values in the data set, an estimated distribution of the data point values in the data set or an actual distribution of data point values in the data set.

Figure 3:
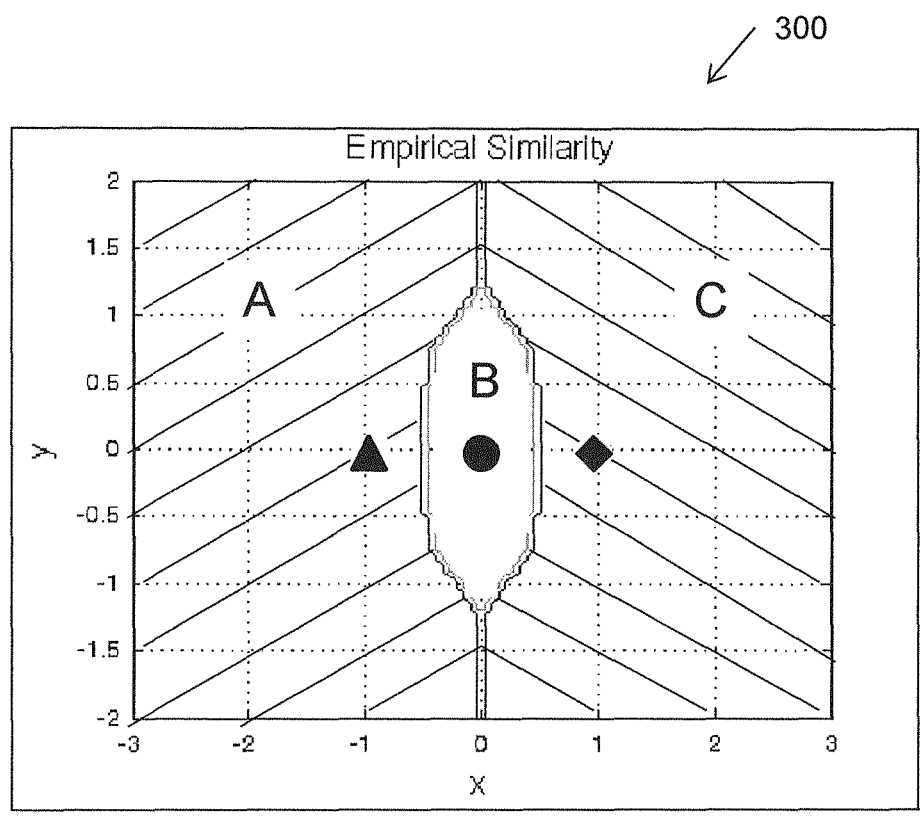
FIG. 3 illustrates results of one embodiment of similarity analysis with tri-point data arbitration given an example set of data points.

Using tri-point arbitration with an arbiter point that represents the data set yields more appealing and practical similarity results than using a tradition two point distance approach. FIG. 3 graphically illustrates a similarity metric 300 that classifies data points as being more similar to either triangle (coordinates −1,0), circle (coordinates 0,0), or diamond (coordinates 1,0). Analysis begins by considering all possible pairs of points {triangle, x} using the other two as a set of analysts: A\triangle={diamond, circle}. The corresponding ρETAC(triangle, x|A\triangle) are computed. The same procedure is repeated for all pairs {diamond, x} and A\diamond={triangle, circle} and for the circle. All points for which ρETAC(diamond, x)>max(ρETAC(triangle, x), ρETAC(circle, x)) are marked as points similar to diamond. And similarly points similar to triangle and circle are marked.

The resulting structuring is presented in FIG. 3. All points lying in the // hashed region A are similar to the triangle point. All points lying in \\ hashed region C are similar to the diamond point. All points within the un-hashed region B are similar to the circle point. Note that there are regions in which distance-wise points may be closer to the "circle" point but are actually more similar to triangle or diamond. Given a query point q one finds the most similar object from the data set {"red","green","blue"} by determining in which region the point q falls.

Figure 4:
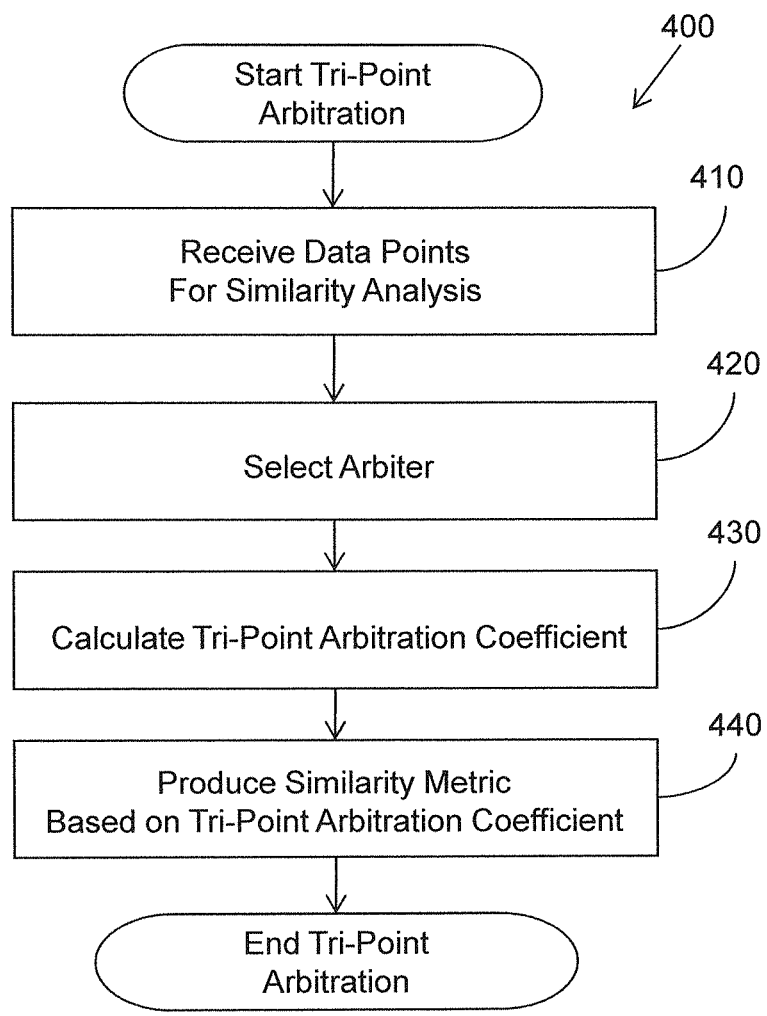
FIG. 4 illustrates an embodiment of a method associated with similarity analysis with tri-point data arbitration.

FIG. 4 illustrates one embodiment of a method 400 for performing tri-point arbitration. The method includes, at 410, selecting a data point pair including a first data point and a second data point from the data set. The method includes, at 420, selecting an arbiter point that is representative of the data set. At 430, the method includes calculating a tri-point arbitration coefficient for the data point pair based, at least in part, on a distance between the first and second data points and the arbiter point. The method includes, at 440, producing a similarity metric for the data set based, at least in part, on the tri-point arbitration coefficients for data point pairs in the set of data points calculated using the selected arbiter point.

Figure 5:
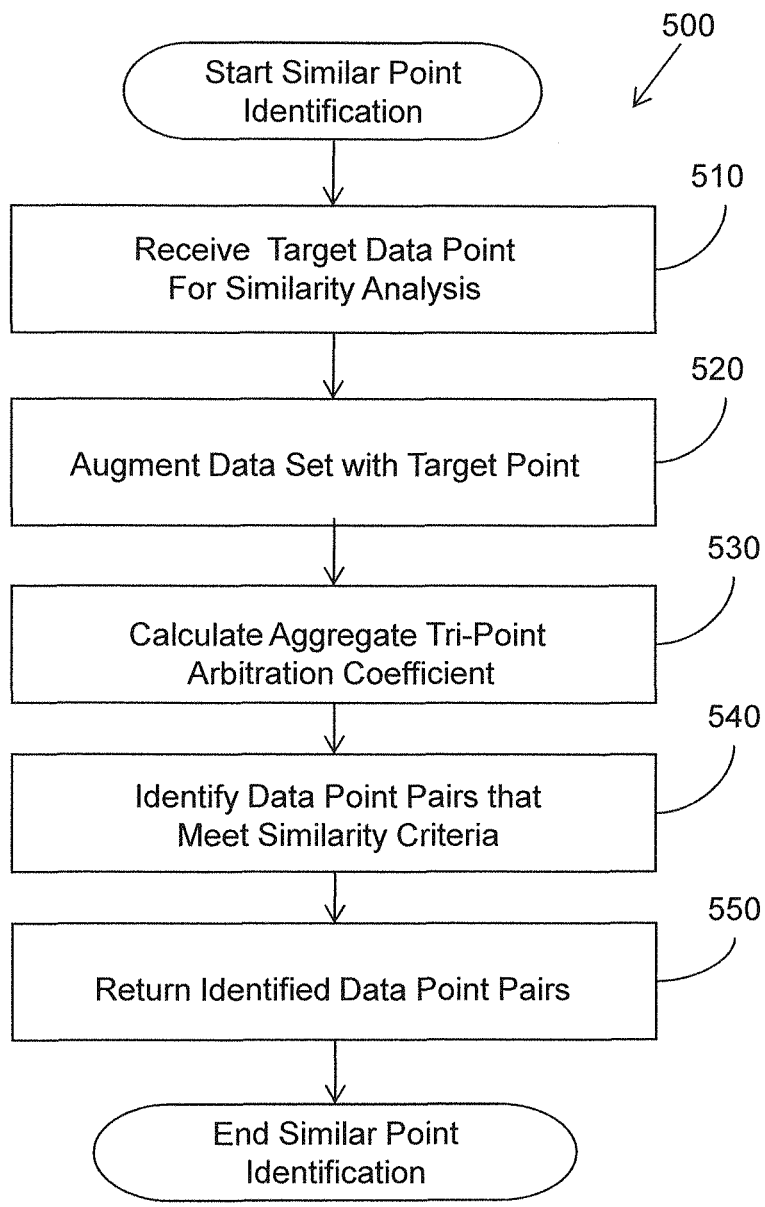
FIG. 5 illustrates an embodiment of a method associated with similarity analysis with tri-point data arbitration.

FIG. 5 illustrates one embodiment of a method 500 that uses tri-point arbitration to return data points that are similar to a target data point in response to a query that specifies the target data point. Recall the example of the doctor searching for patients that are similar to her patient. The method includes, at 510, receiving a query to return data points in a data point set that are similar to a target data point. The method includes, at 520, augmenting the data set with the target data point. Thus, the data set is augmented with a target data point that describes the doctor's patient (the target data point may include 100s of attributes).

The method includes, at 530, calculating respective aggregate tri-point arbitration coefficients for respective data point pairs in the augmented data set. The aggregate tri-point arbitration coefficients are calculated by determining a set of arbiter points that represent data in the augmented data set. For each data point pair in the augmented data set and each arbiter point in the set of arbiter points: i) an arbiter point is selected from the set of arbiter points; ii) a tri-point arbitration coefficient is calculated for the data point pair given the selected arbiter based, at least in part, on a distance between the data point pair and the selected arbiter point; and iii) tri-point arbitration coefficients calculated for the data point pair are aggregated to produce the aggregate tri-point arbitration coefficient for the data point pair.

The method includes, at 540, identifying data point pairs that have aggregate tri-point arbitration coefficients that, when the target data point is used as the arbiter, meet a similarity criteria as similar data point pairs. For example, a row or column in a pair-wise matrix of tri-point arbitration coefficients that corresponds to the target data point may be analyzed to return positive values which indication similarity between a data point pair and the target data point. The method includes, at 550, returning the similar data point pairs.

General Computer Embodiment

Figure 6:
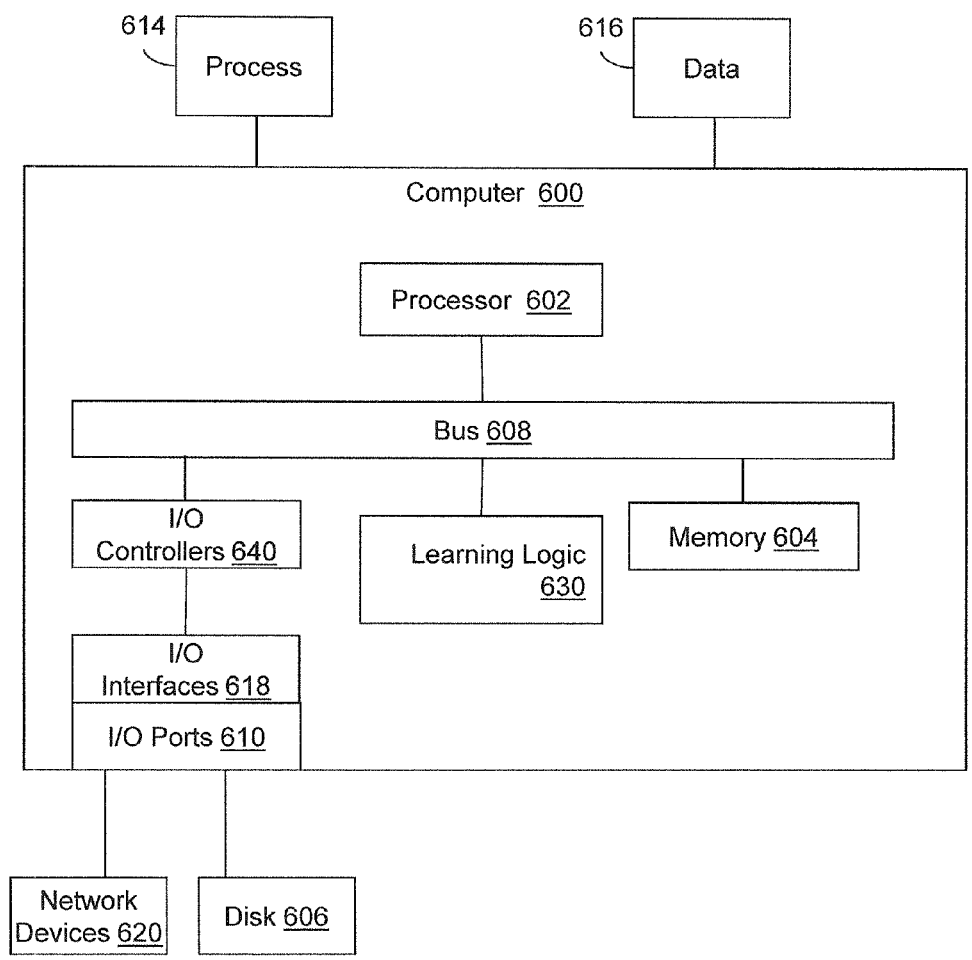
FIG. 6 illustrates an embodiment of a computing system in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a learning logic 630 configured to facilitate similarity analysis using tri-point arbitration. In different examples, the learning logic 630 may be implemented in hardware, a non-transitory computer-readable medium with stored instructions, firmware, and/or combinations thereof. While the logic 630 is illustrated as a hardware component attached to the bus 608, it is to be appreciated that in one example, the learning logic 630 could be implemented in the processor 602.

In one embodiment, learning logic 630 is a means (e.g., hardware, non-transitory computer-readable medium, firmware) for performing similarity analysis using tri-point arbitration.

The means may be implemented, for example, as an ASIC programmed to perform tri-point arbitration. The means may also be implemented as stored computer executable instructions that are presented to computer 600 as data 616 that are temporarily stored in memory 604 and then executed by processor 602.

Learning logic 630 may also provide means (e.g., hardware, non-transitory computer-readable medium that stores executable instructions, firmware) for performing the methods illustrated in FIGS. 4 and 5.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data on a non-transitory computer readable medium. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, a non-transitory computer readable medium that stores instructions, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:

selecting, from a data set, a data point pair comprising a first data point ($x_1$) and a second data point ($x_2$);

selecting an arbiter point (a) that is representative of the data set;

calculating a tri-point arbitration coefficient ($\rho TAC(x_1, x_2|a)$) for the data point pair using a relationship expressed by the formula:

$$\rho TAC(x_1, x_2 | a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}};$$

combining the tri-point arbitration coefficients for all data point pairs to determine a similarity metric for the data set; and using the similarity metric by a machine learning tool such that the machine learning tool uses the similarity metric to discover patterns in the data set.

2. The non-transitory computer-readable medium of claim 1 comprising, for each data point pair, calculating a plurality of tri-point arbitration coefficients using a plurality of arbiter points in a set of arbiter points and combining the plurality of tri-point arbiter coefficients to calculate a tri-point arbitration coefficient for each data point pair.

3. The non-transitory computer-readable medium of claim 2, wherein the set of arbiter points comprises all data points in the data set.

4. The non-transitory computer-readable medium of claim 1, wherein the set of arbiter points comprises selected data points in the data set.

5. The non-transitory computer-readable medium of claim 1, wherein the set of arbiter points comprises a probability distribution of data points in the data set.

6. The non-transitory computer-readable medium of claim 1, where determining the similarity metric comprises combining tri-point arbiter coefficients for data point pairs, where respective tri-point arbiter coefficients are weighted according to representation in the data set of the respective arbiter point used to calculate the respective tri-point arbiter coefficient.

7. The non-transitory computer-readable medium of claim 1, where determining the similarity metric comprises computing a pair-wise tri-point arbitration matrix that arranges tri-point arbitration coefficients in rows and columns, such that a column corresponds to tri-point arbitration coefficients for data point pairs with respect to the same arbiter point.

8. A computing system, comprising:

a tri-point arbitration logic configured to i) select, from a data set, a data point pair comprising a first data point ($x_1$) and a second data point ($x_2$), and ii) select an arbiter point (a) that is representative of the data set;

the tri-point arbitration logic further configured to calculate a tri-point arbitration coefficient ($\rho TAC(x_1, x_2|a)$) for the data point pair using a relationship expressed by the formula:

$$\rho TAC(x_1, x_2 | a) = \frac{\min\{\rho(x_1, a), \rho(x_2, a)\} - (x_1, x_2)}{\max\{\rho(x_1, x_2), \min\{\rho(x_1, a), \rho(x_2, a)\}\}};$$

a similarity logic configured to combine the tri-point arbitration coefficients for all data point pairs to determine a similarity metric for the data set; and a machine learning tool configured to use the similarity metric to discover patterns in the data set.

9. The computing system of claim 8, where the tri-point arbitration logic is further configured to, for each data point pair, i) calculate a plurality of tri-point arbitration coefficients using a plurality of arbiter points from a set of arbiter points and ii) combine the plurality of tri-point arbiter coefficients to calculate an aggregate tri-point arbitration coefficient for each data point pair.

10. The computing system of claim 9, where the set of arbiter points comprises all data points in the data set.

11. The computing system of claim 9, where the set of arbiter points comprises selected data points in the data set.

12. The computing system of claim 9, where the set of arbiter points corresponds to a probability distribution of data points in the data set.

13. The computing system of claim 8, where the similarity logic is configured to combine tri-point arbiter coefficients for data point pairs, where respective tri-point arbiter coefficients are weighted according to representation in the data set of the respective arbiter point used to calculate the respective tri-point arbiter coefficient.

14. The computing system of claim 8, where the similarity logic is configured to compute a pair-wise tri-point arbitration matrix that arranges tri-point arbitration coefficients in rows and columns, such that a column corresponds to tri-point arbitration coefficients for data point pairs with respect to the same arbiter point.

15. A computer-implemented method comprising, with a processor:

selecting, from a data set, a data point pair comprising a first data point ($x_1$) and a second data point ($x_2$);

selecting an arbiter point (a) that is representative of the data set;

calculating a tri-point arbitration coefficient ($\rho TAC(x_1, x_2 | a)$) for the data point pair using a relationship expressed by the formula:

$$\rho TAC(x_1, x_2 | a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}};$$

combining the tri-point arbitration coefficients for all data point pairs to determine a similarity metric for the data set; and using the similarity metric by a machine learning tool such that the machine learning tool uses the similarity metric to discover patterns in the data set.

16. The computer-implemented method of claim 15 comprising, with the processor, for each data point pair, calculating a plurality of tri-point arbitration coefficients using a plurality of arbiter points in a set of arbiter points and combining the plurality of tri-point arbiter coefficients to calculate a tri-point arbitration coefficient for each data point pair.

17. The computer-implemented method of claim 16, wherein the set of arbiter points comprises all data points in the data set.

18. The computer-implemented method of claim 15, wherein the set of arbiter points comprises selected data points in the data set.

19. The computer-implemented method of claim 15, wherein the set of arbiter points comprises a probability distribution of data points in the data set.

20. The computer-implemented method of claim 15 comprising, with the processor, determining the similarity metric by combining tri-point arbiter coefficients for data point pairs, where respective tri-point arbiter coefficients are weighted according to representation in the data set of the respective arbiter point used to calculate the respective tri-point arbiter coefficient.

21. The computer-implemented method of claim 15 comprising, with the processor, determining the similarity metric by computing a pair-wise tri-point arbitration matrix that arranges tri-point arbitration coefficients in rows and columns, such that a column corresponds to tri-point arbitration coefficients for data point pairs with respect to the same arbiter point.

* * * * *